US008678976B1

(12) United States Patent  
Wilson et al.

(10) Patent No.: US 8,678,976 B1
(45) Date of Patent: Mar. 25, 2014

(54) VEHICLES INCLUDING DIFFERENTIAL LOCK CONTROLLER AND METHODS

(71) Applicant: Honda Motor Co., Ltd., Tokyo (JP)

(72) Inventors: Andrew James Wilson, Marysville, OH (US); Rodney Frijas, Powell, OH (US); Masaki Yamazaki, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/769,440

(22) Filed: Feb. 18, 2013

(51) Int. Cl.
*B60W 10/06* (2006.01)
*B60W 10/12* (2012.01)

(52) U.S. Cl.
USPC .......................................................... 477/35

(58) Field of Classification Search
USPC ................................................. 477/35, 115
See application file for complete search history.

(56) References Cited

U.S. PATENT DOCUMENTS

| 3,788,166 | A | 1/1974 | Hart et al. |
| 7,774,129 | B2 | 8/2010 | Washio |
| 7,957,870 | B2 * | 6/2011 | Ross .............................. 701/53 |
| 2007/0051552 | A1 | 3/2007 | Reed |
| 2008/0090688 | A1 * | 4/2008 | Torres et al. .................... 475/35 |
| 2009/0056665 | A1 * | 3/2009 | Yamazaki .................. 123/185.3 |
| 2009/0243791 | A1 | 10/2009 | Partin et al. |
| 2010/0250049 | A1 * | 9/2010 | Nihei et al. ..................... 701/29 |

\* cited by examiner

*Primary Examiner* — Edwin A Young
(74) *Attorney, Agent, or Firm* — Ulmer & Berne LLP (57) ABSTRACT

A vehicle includes wheels, an engine, a start switch, a differential, and a differential lock controller. Each wheel is rotatable at a respective wheel speed. The start switch is configured to selectively initiate of operation of the engine. The differential is associated with the wheels and includes a differential lock. The differential lock is selectively movable between a locked position and an unlocked position. The wheels are rotatable together when the differential lock is in the locked position. The differential lock controller is configured to facilitate restriction of the wheel speed of at least one of the wheels when the differential lock is in the locked position. The differential lock controller is further configured to facilitate selective disablement of the wheel speed restriction when the start switch is actuated with the engine operating. Methods are also provided.

20 Claims, 6 Drawing Sheets

VEHICLES INCLUDING DIFFERENTIAL LOCK CONTROLLER AND METHODS

TECHNICAL FIELD

A vehicle includes a start switch configured to selectively and alternatively initiate operation of its engine and disable a wheel speed restriction when the engine is operating with a locked differential.

BACKGROUND

Conventional vehicles are provided with multifunction switches that serve several purposes during operation of the vehicle.

SUMMARY

In accordance with one embodiment, a vehicle comprises a pair of wheels, an engine, a start switch, a differential, and a differential lock controller. Each wheel is rotatable at a respective wheel speed. The engine is configured to provide motive power to at least one of the pair of wheels. The start switch is configured to facilitate selective initiation of operation of the engine. The differential is associated with the pair of wheels and includes a differential lock. The differential lock is selectively movable between a locked position and an unlocked position. The pair of wheels is rotatable together when the differential lock is in the locked position. The differential lock controller is configured to facilitate restriction of the wheel speed of at least one of the wheels when the differential lock is in the locked position. The differential lock controller is further configured to facilitate selective disablement of the restriction of the wheel speed when the start switch is actuated with the engine operating.

In accordance with another embodiment, a vehicle comprises a pair of wheels, an engine, a start switch, a differential, a controller, and a relay. The engine is configured to provide motive power to at least one of the pair of wheels. The differential is associated with the pair of wheels and includes a differential lock. The differential lock is selectively movable between a locked position and an unlocked position. The controller is associated with the engine and is configured to control at least one feature of the engine. The relay is in electrical communication with each of the start switch and the engine. The relay is operable in one of a first mode and a second mode in response to operation of the engine. When the relay is in the first mode, actuation of the start switch facilitates initiation of operation of the engine. When the relay is in the second mode, actuation of the start switch facilitates overriding of at least one feature of the controller.

In accordance with yet another embodiment, a method of controlling a vehicle is provided. The vehicle comprises a pair of wheels and a differential associated with the pair of wheels and includes a differential lock. The method comprises initiating operation of an engine of the vehicle in response to actuation of a start switch when the engine is not operating. The method further comprises moving the differential lock to a locked position and restricting the wheel speed of at least one of the pair of wheels when the differential lock is in the locked position. The method further comprises disabling the restriction of the wheel speed in response to actuation of the start switch during operation of the engine.

BRIEF DESCRIPTION OF THE DRAWINGS

It is believed that certain embodiments will be better understood from the following description taken in conjunction with the accompanying drawings in which.

DETAILED DESCRIPTION

Figure 1:
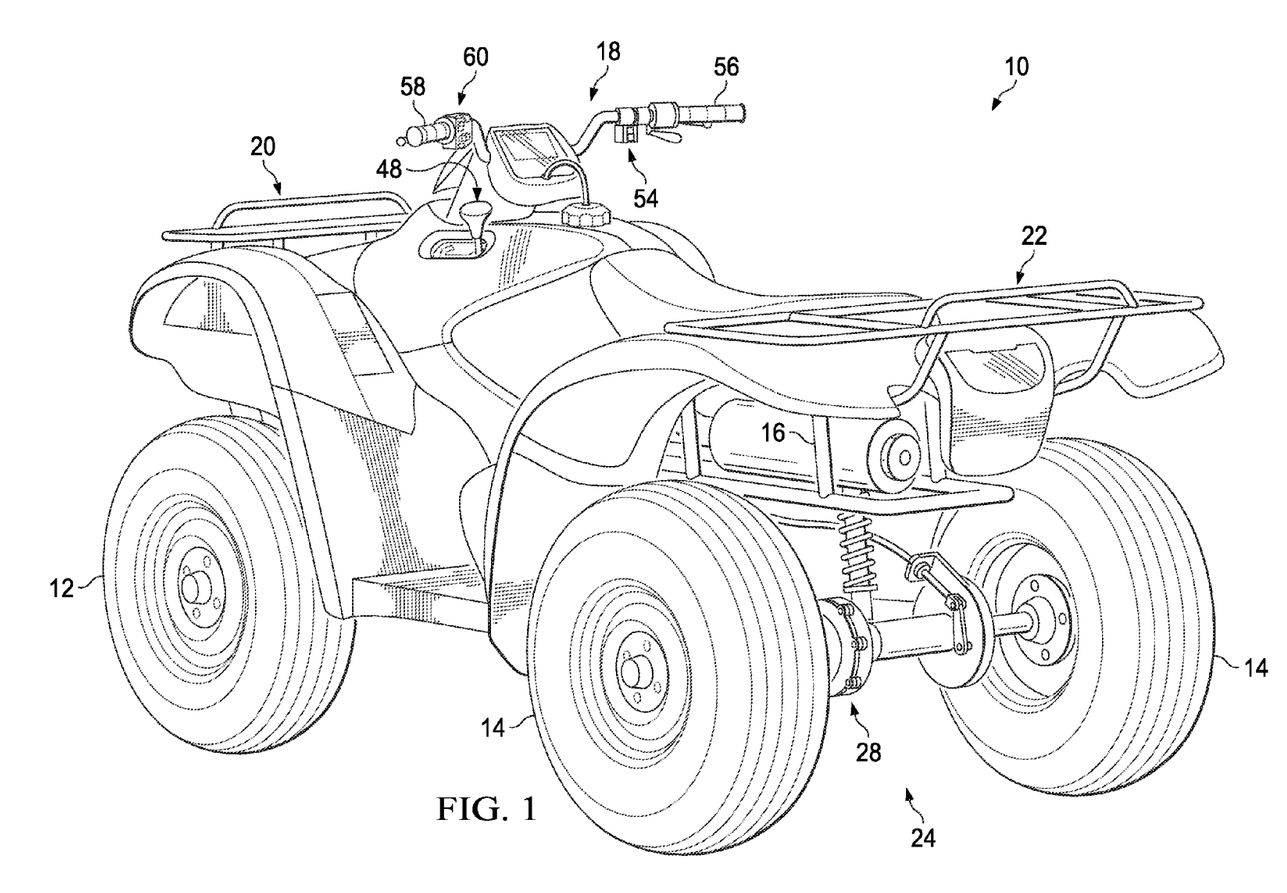
FIG. 1 is an elevated rear perspective view depicting a vehicle in accordance with one embodiment.

Embodiments are hereinafter described in detail in connection with the views and examples of FIGS. 1-7, wherein like numbers indicate the same or corresponding elements throughout the views. FIG. 1 illustrates a vehicle 10 which is shown to comprise an all-terrain vehicle ("ATV"). However, a vehicle in accordance with alternative embodiments can comprise an automobile, a truck, a van, a recreational vehicle, a utility vehicle, agricultural equipment, or construction equipment, for example.

Figure 2:
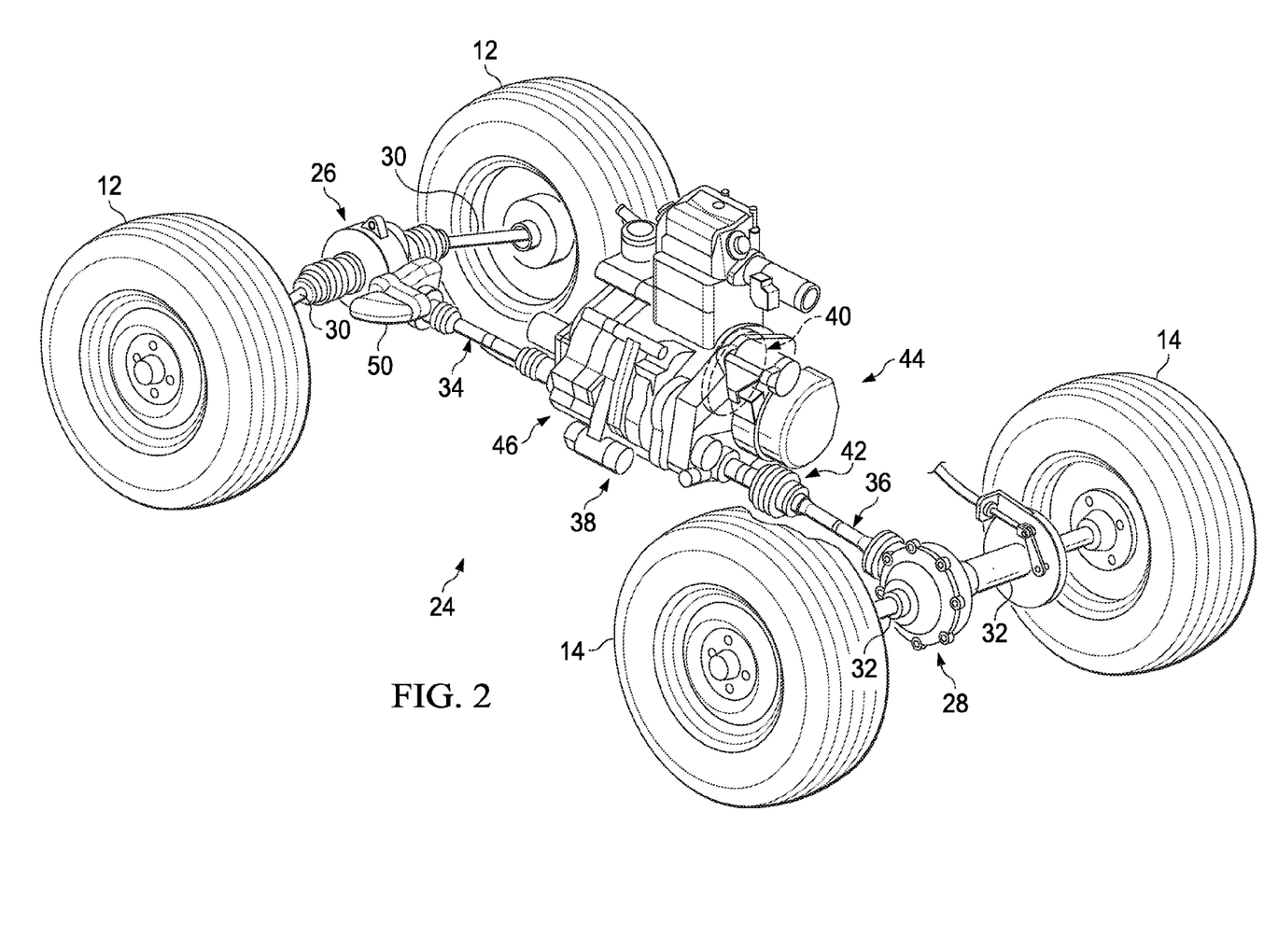
FIG. 2 is an elevated rear perspective view depicting portions of a drive train and certain other components of the vehicle of FIG. 1.

The vehicle 10 is shown to include two pairs of wheels. In particular, as shown in FIGS. 1-2, the vehicle 10 can include a pair of front wheels 12 and a pair of rear wheels 14, each rotatably coupled with respect to a vehicular frame 16. Each front and rear wheel (e.g., 12, 14) can be rotatable at a respective wheel speed. The front wheels 12 can comprise steerable wheels. A pair of handlebars 18 can be operably coupled with the front wheels 12 to facilitate steering of the front wheels 12. The vehicle 10 can also include front and rear cargo racks 20, 22 that are respectively supported at a front and a rear of the vehicle 10 by the vehicular frame 16. The front and rear cargo racks 20, 22 can facilitate support of cargo for transportation by the vehicle 10. Although the front and rear cargo racks 20, 22 are shown in FIG. 1 to comprise tubular frame assemblies, it will be appreciated that the front and rear cargo racks 20, 22 can be configured in any of a variety of suitable alternative arrangements for carrying cargo. It will also be appreciated that, in lieu of a front and/or a rear cargo rack, a vehicle may include a pump unit, a digging implement, a towing platform, a crane, additional passenger seating, or any of a variety of other implements.

Figure 3:
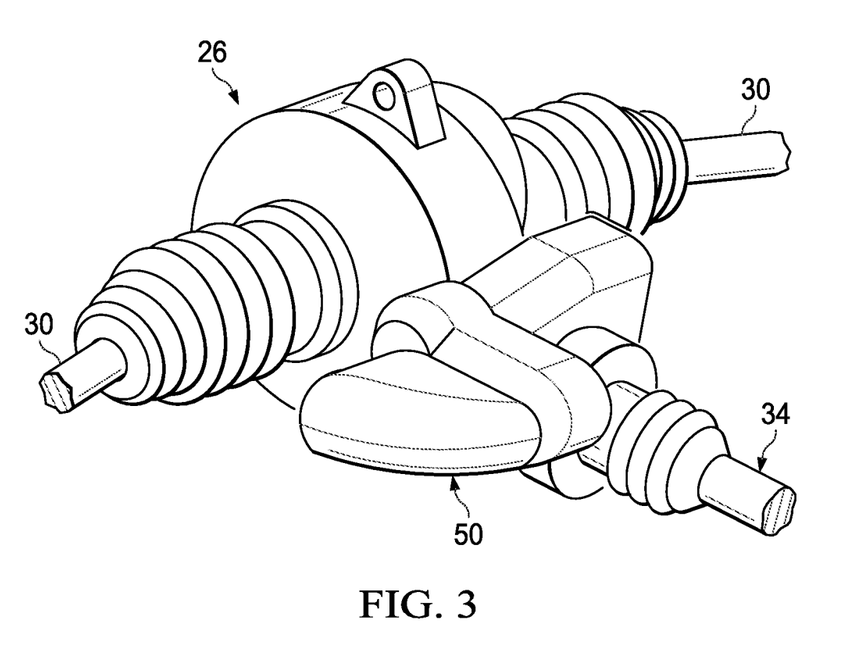
FIG. 3 is an enlarged elevated rear perspective view depicting a differential and various components of the drive train of FIG. 2.

As illustrated in FIGS. 1-2, the vehicle 10 can include a drive train 24. The drive train 24 is shown to include a front differential 26 and a rear final gear 28. As illustrated in FIGS. 2-3, the front differential 26 is shown to be coupled with a pair of front axles 30 that facilitate driving of the front wheels 12. The rear final gear 28 is shown to be coupled with a pair of rear axles 32 that facilitate driving of the rear wheels 14. The drive train 24 is shown to include a front drive member 34 and a rear drive member 36 respectively coupled with the front differential 26 and the rear final gear 28. The drive train 24 is also shown to include a transmission 38 coupled with the front differential 26 and the rear final gear 28. The transmission 38 can be a hydraulic-type transmission, a hydrostatic-type transmission, a belt driven transmission (e.g., a continuously variable transmission), or manual transmission, or any of a variety of other suitable transmission arrangements.

The front differential 26 can be configured to facilitate selective variation of the wheel speed of each of the front wheels 12 with respect to one another. For example, when the vehicle 10 is navigating a turn, the front wheels 12 can rotate at different wheel speeds with respect to one another. In particular, the front differential 26 can be configured such that an increased wheel speed in one of the front wheels 12 causes a decreased wheel speed in the other front wheel 12. In one embodiment, the wheel speed of the front and rear wheels 12, 14 can be determined from wheel speed sensors (not shown) located on one or more of the wheels (e.g., as part of an antilock braking system). In other embodiments, the speed of the wheels can be determined from a drive shaft speed sensor or any of a variety of other suitable arrangements.

The transmission 38 can include an input and an output. In one example, and as illustrated in FIG. 2, the transmission 38 can include a flywheel 40 and an output shaft 42. The flywheel 40 can be coupled with an engine 44 (e.g., through a crankshaft) and the output shaft 42 can be coupled with the rear drive member 36. It will be appreciated that the engine 44, which can be configured to provide motive power to the wheels (e.g., 12, 14), can comprise an internal combustion engine, or can alternatively comprise an electric motor or other source of motive power. The input and output of the transmission 38 can be associated with each other such that operation of the input facilitates operation of the output. As is common, the transmission 38 can operate in a variety of gears such that the engine 44 can drive the wheels (e.g., 12, 14) at a variety of different wheel speeds and torques, and in different directions.

In one embodiment, the transmission 38 can be configured to selectively and alternatively operate in a variety of different gears, such as neutral, reverse, first gear, second gear, third gear, fourth gear, fifth gear, and overdrive. When in neutral, power from the engine 44 is not transmitted to any of the wheels (e.g., 12, 14). When the transmission 38 is in reverse, power from the engine 44 can be transmitted to at least one of the wheels to facilitate movement of the vehicle 10 in a reverse direction. When in each of the first, second, third, fourth, fifth, and overdrive gears, power from the engine 44 can be transmitted to at least one of the wheels to facilitate movement of the vehicle 10 in a forward direction. As is common, the transmission 38 can be shifted among the forward gears to facilitate operation of the wheels (e.g., 12, 14) at a variety of different forward speed ranges. It will be appreciated that, although the transmission 38 is described above to include multiple forward gears, a transmission can alternatively be configured to have only a single forward gear.

With reference to FIG. 2, a transfer assembly 46 can be associated with the output shaft 42 of the transmission 38. The transfer assembly 46 can be configured to selectively couple the output shaft 42 to the front drive member 34 (e.g., with a chain or gears) to facilitate operation of the vehicle 10 in one of a two-wheel drive (2WD) mode and a four-wheel drive (4WD) mode. When the output shaft 42 is uncoupled from the front drive member 34, the vehicle 10 can operate in a rear-wheel 2WD mode. When the output shaft 42 is coupled with the front drive member 34, the vehicle 10 can operate in the 4WD mode. In an alternative embodiment, a transfer assembly can additionally selectively couple a rear output shaft of a transmission with a rear drive member such that the transfer assembly can facilitate selective operation of an associated vehicle in a 2WD mode in which only a pair of front wheels are driven, a 2WD mode in which only a pair of rear wheels are driven, and a 4WD mode in which front and rear wheels are driven.

Figure 4:
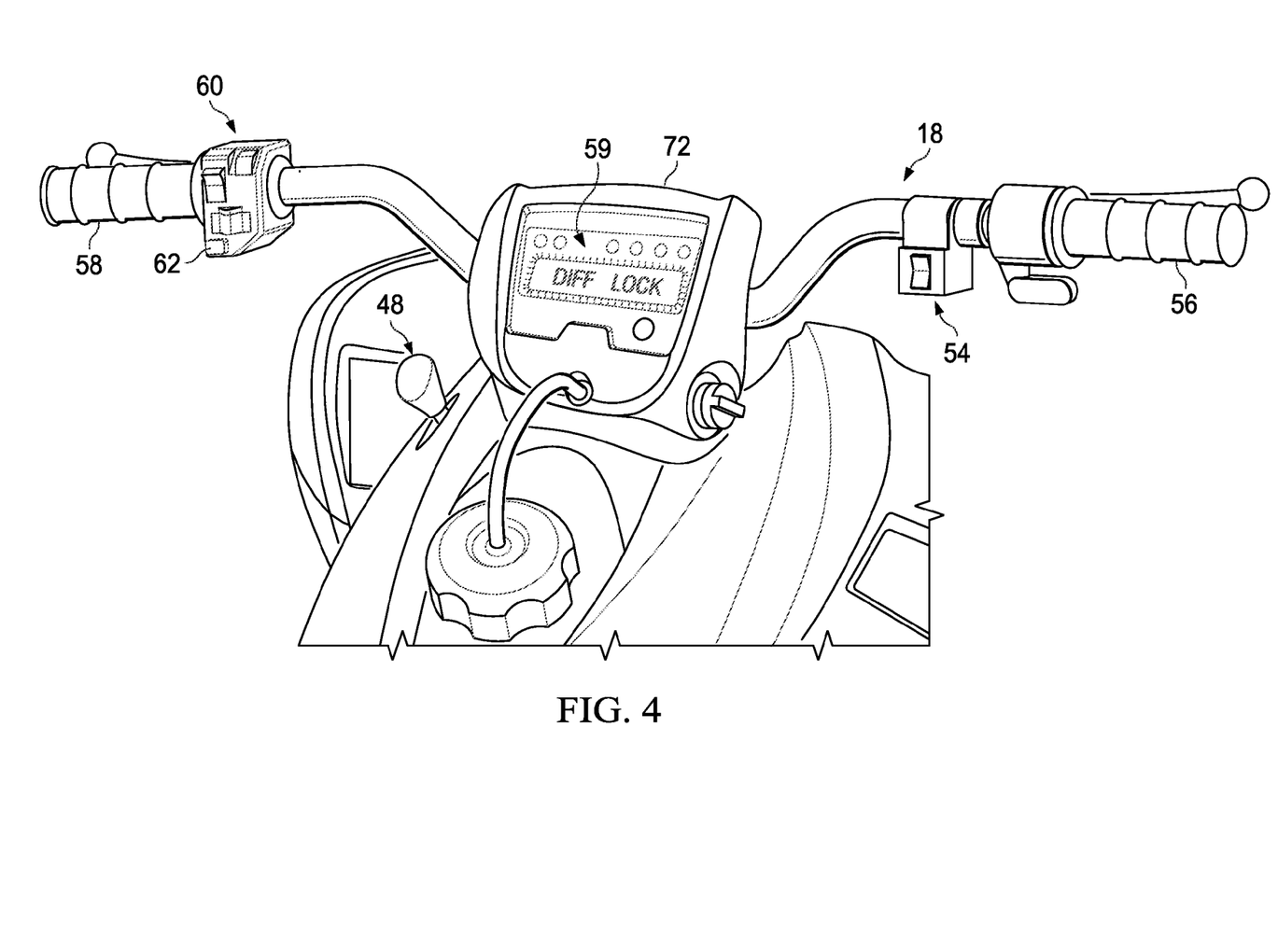
FIG. 4 is an enlarged elevated rear perspective view depicting handlebars and other components of the vehicle of FIG. 1.

As illustrated in FIGS. 1 and 4, the vehicle 10 can include a 2WD/4WD lever 48 that is provided adjacent to the handlebars 18 and can be operatively coupled with the transfer assembly 46. In one embodiment, the 2WD/4WD lever 48 is movable between a 2WD position and a 4WD position. When the 2WD/4WD lever 48 is in the 2WD position, the transfer assembly 46 can facilitate operation of the vehicle 10 in a 2WD mode (e.g., rear-wheel 2WD mode). When the 2WD/4WD lever 48 is in the 4WD position, the transfer assembly 46 can facilitate operation of the vehicle 10 in the 4WD mode.

When the wheel speed of one of the front wheels 12 suddenly increases (e.g., when the vehicle navigates rough or slippery terrain), the wheel speed of the opposite front wheel 12 can suddenly decrease, thereby affecting desired operation of the vehicle 10 in certain driving conditions. The front differential 26 can, however, be selectively locked to ensure that both of the front wheels 12 rotate at the same wheel speed. As such, a front differential lock 50 can be associated with the front differential 26, as illustrated in FIGS. 2-3. In one embodiment, the front differential lock 50 can comprise a motor controlled, ring-type lock. It will be appreciated, however, that any of a variety of suitable alternative differential lock configurations can be used.

The front differential lock 50 can be selectively movable between a locked position and an unlocked position to respectively lock and unlock the front differential 26. When the front differential lock 50 is in the unlocked position, the front wheels 12 can be free to rotate at different wheel speeds with respect to one another. However, when the front differential lock 50 is in the locked position, the front wheels 12 can be constrained to rotate in unison with one another.

Figure 7:
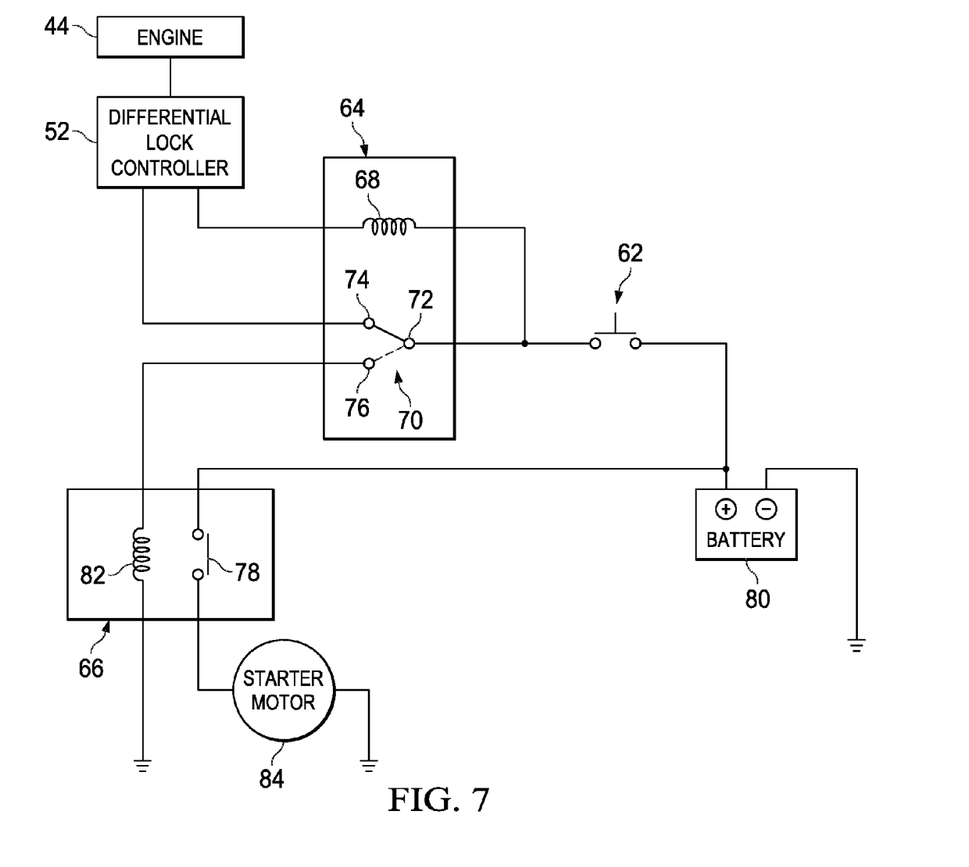
FIG. 7 is a schematic view depicting a differential lock controller and certain associated components of the vehicle of FIG. 1.

The front differential lock 50 can be associated with a differential lock controller (generally shown as 52 in FIG. 7). As illustrated in FIGS. 1 and 4, the vehicle 10 can include a differential lock switch 54 that is in communication with the differential lock controller 52 and is configured to facilitate selective movement of the front differential lock 50 between the locked position and the unlocked position by an operator of the vehicle 10. In particular, the differential lock switch 54 can be configured for actuation by an operator between a lock-initiate position and an unlock-initiate position when the operator wants to either respectively lock or unlock the front differential 26. For example, if the vehicle 10 encounters difficult terrain, an operator can actuate the differential lock switch 54 to lock the front differential 26 and thereby improve the traction of the front wheels 12. In another example, if some of the wheels (e.g., 12, 14) are unable to gain traction (e.g., the vehicle 10 is hindered by muddy terrain), the front differential 26 can be selectively locked such that the front wheels 12 can attempt to gain traction.

To facilitate locking and unlocking of the front differential 26, the differential lock switch 54 can be configured to send a signal to the differential lock controller 52 to indicate when the differential lock switch 54 has been moved into either the lock-initiate or unlock-initiate positions. The differential lock controller 52 can facilitate either locking or unlocking of the front differential 26 in response to the signal from the differential lock switch 54. In some embodiments, the differential lock controller 52 might delay locking or unlocking of the front differential 26 until a vehicular operating condition is within a predefined range (e.g., the speed of the vehicle is below 20 KPH).

In one embodiment, the differential lock switch 54 can comprise a three-position rocker switch. In such an embodiment, when the user releases the differential lock switch 54 from either the lock-initiate or unlock-initiate position, the differential lock switch 54 can automatically move into a home position. It will be appreciated, however, that any of a variety of suitable alternative differential lock switches can be used, such as one or more pushbuttons or a selection lever, for example. As illustrated in FIGS. 1 and 4, the differential lock switch 54 can be mounted on the pair of handlebars 18 adjacent to a right hand grip 56 such that, during operation of the vehicle 10, a user can actuate the differential lock switch 54 (e.g., with a thumb) without releasing the right hand grip 56. It will be understood that the differential lock switch 54 can alternatively be located adjacent to a left hand grip 58 or at other various different suitable locations on the vehicle 10.

Referring again to FIG. 4, the pair of handlebars 18 can include a center console 72 that includes a differential lock indicator 59. The differential lock indicator 59 can be associated with and controlled by the differential lock controller 52. In one embodiment, the differential lock indicator 59 can be configured to indicate when the front differential lock 50 is in the locked position. For example, when the front differential 26 is locked, the differential lock indicator 59 can illuminate to notify the operator of the vehicle 10. The differential lock indicator 59 can additionally or alternatively comprise any one of an indicator light, a display icon, a heads-up display icon, a buzzer, or some other visual and/or indicator, for example.

Figure 5:
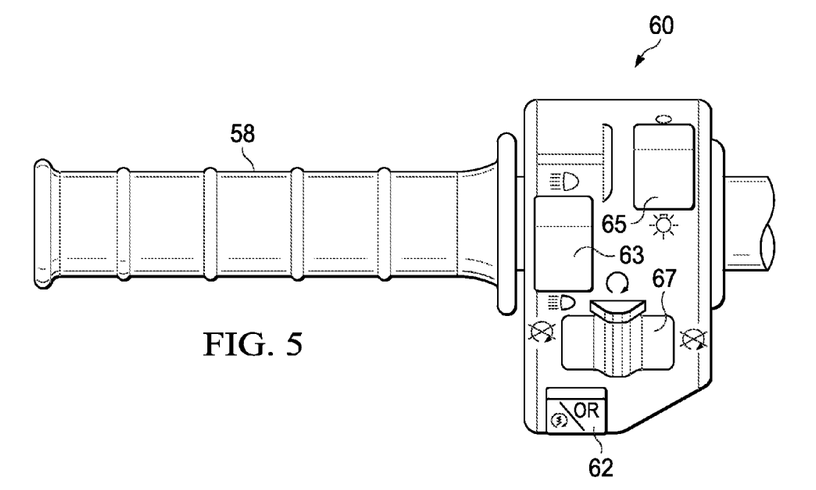
FIG. 5 is a rear view depicting a switch assembly associated with a portion of the handlebars of FIG. 4, according to one embodiment.

As illustrated in FIGS. 1 and 4-5, the vehicle 10 can include a switch assembly 60 that includes a start switch 62. When the engine 44 is not operating (e.g., turned off), the start switch 62 can be actuated to initiate operation of the engine 44. In one embodiment, as illustrated in FIGS. 1 and 4-5, the switch assembly 60 can be located adjacent to the left hand grip 58 and the start switch 62 can comprise a pushbutton. The pushbutton can be biased into a non-actuated position (e.g., by an internal spring) and can be selectively depressed by a left hand of an operator without releasing the left hand grip 58. As illustrated in FIG. 5, the switch assembly 60 can also include a hi/lo switch 63, a headlight switch 65, and an engine stop switch 67. However, it will be understood that any of a variety of other suitable switch types and/or switch assembly locations can be provided. For example, a switch assembly can alternatively be located adjacent to the right hand grip 56. In another example, a start switch can comprise a rotary-type ignition switch that can be actuated with a key, as is common on many vehicles. Additional or alternative switches can be provided on handlebars for controlling a variety of other functions of the vehicle 10.

Referring again to the operation of front differential lock 50, when the front differential 26 is locked, the differential lock controller 52 can be configured to facilitate restriction of the wheel speed of at least one of the wheels such that the vehicle 10 does not increase above a threshold speed. In one embodiment, once the front differential 26 is locked, the differential lock controller 52 can restrict the speed of the front and rear wheels 12, 14 such that the vehicle speed (e.g., as determined from wheel speed sensors) does not exceed about 20 KPH, for example. It will be appreciated that such restriction of the speed of the front and rear wheels 12, 14 can be accomplished by automated control by the differential lock controller 52 of an engine throttle, ignition, retardation, braking or otherwise.

When the front differential 26 is locked, there may be occasions when it is desirable to override the restriction of the wheel speed. For example, if the wheels (e.g., 12, 14) are unable to maintain sufficient traction to move the vehicle 10, it may be possible to gain sufficient traction by allowing the wheels (e.g., 12, 14) to rotate faster.

In one embodiment, the start switch 62 can be configured to facilitate disablement of the restriction of the wheel speed when the engine 44 is operating. The start switch 62 can thus be configured as a dual-purpose switch. For example, when the engine 44 is not operating, the start switch 62 can be actuated to start the engine 44, as described above. However, once the engine 44 has started, the start switch 62 can be actuated to override the speed restriction function when the front differential 26 is locked.

To facilitate use of the start switch 62 as a dual-purpose switch, the vehicle 10 can comprise a relay 64, as illustrated in FIG. 7, that is configured to facilitate selective electrical communication between the start switch 62 and one of a starter solenoid 66 and the differential lock controller 52, in response to operation of the engine 44. The relay 64 is shown to include an energizing coil 68 and a two-position switch 70. The energizing coil 68 can be electrically coupled to each of the differential lock controller 52 and an input 72 of the relay 64. The input 72 of the relay 64 can be electrically coupled with the start switch 62. First and second outputs 74, 76 of the two-position switch 70 can be electrically coupled with the differential lock controller 52 and the starter solenoid 66, respectively. The starter solenoid 66 includes an initiate coil 82 and a contact 78. The start switch 62 can be coupled with a battery 80.

The relay 64 can be operable in one of an energized mode and a de-energized mode depending upon operation of the engine 44. As illustrated in FIG. 7, the differential lock controller 52 can be coupled with the engine 44 to facilitate monitoring of the operational status of the engine 44. In one embodiment, the differential lock controller 52 can be a general purpose controller that is configured to control at least one feature of the engine 44 such as ignition timing, fuel distribution, and/or cylinder management, for example. When the engine 44 is not operating, the differential lock controller 52 can prevent energization of the energizing coil 68, such that the relay 64 is in the de-energized mode. When the relay 64 is in the de-energized mode, the two-position switch 70 can be in a first position (shown as a dashed line in FIG. 7) such that actuation of the start switch 62 provides power from the battery 80 to the initiate coil 82 which in turn causes closing of the contact 78 which provides electrical power from the battery 80 to a starter motor 84.

Once the engine 44 has started and is operating, the operator can release the start switch 62 which deactivates the starter solenoid 78 and results in removal of electrical power from the starter motor 84. With the engine 44 now operating, and when the start switch 62 is pressed again, the differential lock controller 52 can allow energization of the energizing coil 68 such that the relay 64 is in the energized mode. When the relay 64 is in the energized mode, the two-position switch 70 can be in a second position (shown as a solid line in FIG. 7) such that the start switch 62 is in electrical communication with the differential lock controller 52 and provides electrical power from the battery 80 to the differential lock controller 52, which can result in the differential lock controller 52 disabling the restriction of wheel speed when the front differential 26 is locked.

In one embodiment, once the start switch 62 is actuated with the front differential 26 locked, the speed restriction remains disabled until the front differential 26 is unlocked. In another embodiment, when the start switch 62 is actuated with the front differential 26 locked, restriction of the vehicle's speed can remain disabled until the start switch 62 is released. In another embodiment, when the start switch 62 is actuated with the front differential 26 locked, restriction of the vehicle's speed can remain disabled for a predetermined amount of time. In yet another embodiment, when the start switch 62 is actuated with the front differential 26 locked, restriction of the vehicle's speed can remain disabled until the vehicle 10 exceeds a threshold speed (e.g., 30 KPH). In still another embodiment, when the start switch 62 is actuated with the front differential 26 locked, restriction of the vehicle's speed can remain disabled until the start switch 62 is actuated again.

In one embodiment, the differential lock controller 52 can be configured to facilitate disabling of the restriction of the wheel speed once the start switch 62 is actuated. In another embodiment, the differential lock controller 52 can delay disabling restriction of the wheel speed until the start switch 62 has been actuated for a predetermined amount of time such as, for example, greater than about two seconds. In some embodiments, the start switch 62 might be limited only to selectively initiating operation of an engine and disabling of a wheel speed restriction, while in other embodiments the start switch 60 might be configured to additionally facilitate control of other vehicular functions.

Figure 6:
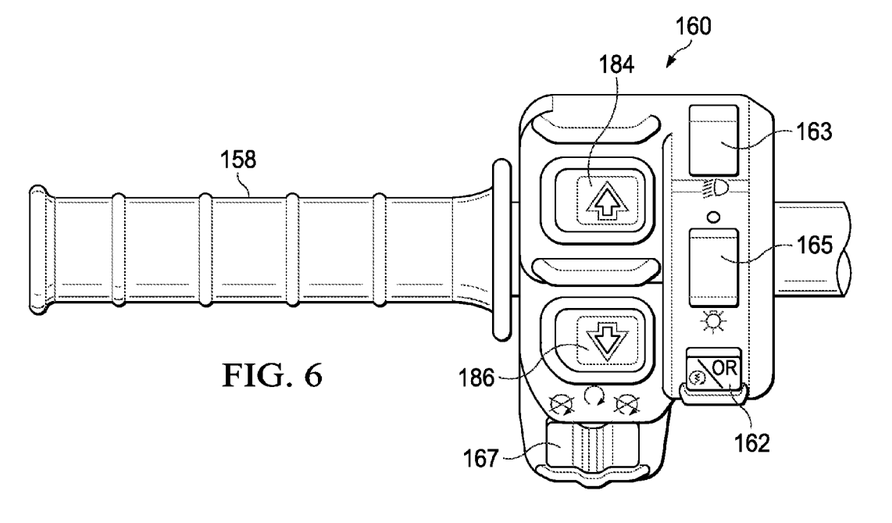
FIG. 6 is a rear view depicting a switch assembly associated with a portion of handlebars, according to another embodiment.

FIG. 6 illustrates a switch assembly 160 associated with a left hand grip 158 of handlebars according to another embodiment. The switch assembly 160 can be similar to, or the same in many respects as, the switch assembly 60 shown in FIGS. 1, 4 and 5. For example, the switch assembly 160 can include a start switch 162, a hi/lo switch 163, a headlight switch 165, and an engine stop switch 167. However, the switch assembly 160 can include an upshift button 184 (shown with an upward arrow in FIG. 6) and a downshift button 186 (shown with a downward arrow in FIG. 6). The upshift and downshift buttons 184, 186 can facilitate electronic shifting of the transmission 38 between different driving gears. In particular, a user can depress the upshift button 184 to shift the transmission 38 into a higher gear and can depress the downshift button 186 to shift the transmission 38 into a lower gear. In such an embodiment, the transmission 38 can comprise an automated manual transmission ("AMT") or any of a variety of other suitable electronic shift-type transmissions. It will be appreciated that electronic shifting of the transmission 38 can be achieved with any of a variety of suitable alternative shift actuators, such as a three-position rocker switch similar to that described above with respect to the differential lock switch 54.

Referring again to FIG. 5, the switch assembly 60 is shown not to include any upshift or downshift buttons. In this arrangement, shifting of the transmission can occur through any of a variety of other transmission shifting arrangements. For example, the transmission 38 can comprise an automatic-type transmission having a shift lever that is movable (e.g., by an operator) between a park position, a reverse position, a neutral position, and multiple drive positions (e.g., D4, D3, D2, etc.). When the shift lever is moved into the reverse position, the transmission 38 can operate in the reverse mode. When the shift lever is moved into the neutral position, the transmission 38 can operate in the neutral mode. When the shift lever is moved into the drive position, the transmission 38 can automatically shift between the forward driving gear modes during operation of the vehicle 10. In one embodiment, automatic shifting of the transmission 38 can be achieved through use of a transmission control unit (TCU) or a powertrain control module (PCM), for example.

In another example, the transmission 38 can comprise a manual-type transmission. In such embodiments, the transmission 38 can be operably coupled with a clutch (not shown). A user can selectively operate the clutch (e.g., through the use of a grip lever or a foot pedal) to enable manual shifting of the transmission 38 between the operating modes. The transmission 38 can be manually shifted with a shift lever, a pushbutton (e.g., upshift and downshift buttons 184, 186), or any of a variety of suitable shifting arrangements. In an alternative embodiment, the transmission 38 can comprise a continuously variable transmission ("CVT"). In such an embodiment, the transmission 38 can have an infinitely variable gear ratio such that in one mode, the CVT can operate in a first gear ratio range and, in another mode, the CVT can operate in a second gear ratio range. It is to be appreciated that any of a variety of suitable transmission and transmission shifting arrangements can be provided.

It will be appreciated that in some embodiments, in lieu of a rear final gear 28, the vehicle 10 can include a rear differential (not shown). The rear differential can be coupled with the pair of rear wheels 14 by way of the rear axles 32 and can be similar in many respects to the front differential 26. For example, the rear differential can include a rear differential lock that is controlled by the differential lock controller 52. It will be appreciated that the rear differential can be controlled by the differential lock controller 52 in a similar manner as described above with respect to the front differential 26. In one embodiment, the differential lock controller 52 can be configured to facilitate operation of the rear differential lock simultaneously with the operation of the front differential lock 50. In an alternative embodiment, the differential lock controller 52 can be configured to facilitate operation of only the rear differential lock. In another alternative embodiment, the differential lock controller 52 can be configured to facilitate independent operation of the front and rear differential locks.

Although the vehicle 10 is shown to be of a type having four wheels (e.g., 12, 14), it will be appreciated that a vehicle can alternatively include more than four wheels or less than four wheels. In addition, although the drive train 24 is shown to include a front differential 26 with associated front differential lock 50, it will be appreciated that a drive train can be provided in any of a variety of suitable alternative configurations. For example, a rear-wheel drive vehicle might include only a rear differential and an associated rear differential lock. A differential lock controller can work with vehicles having one, two, or more than two differentials, wherein some or all of those differentials are capable of locking.

It will be appreciated that a differential lock controller can be provided upon a vehicle in any of a variety of suitable locations and configurations. The differential lock controller can be a stand-alone controller or can alternatively be integrated into a vehicular controller such as an electronic control unit (ECU), for example. It will also be appreciated that the differential lock controller can be configured to implement any of a variety of suitable control routines or functionality.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A vehicle comprising:
   a pair of wheels, each wheel being rotatable at a respective wheel speed;
   an engine configured to provide motive power to at least one of the pair of wheels;
   a start switch configured to facilitate selective initiation of operation of the engine;
   a differential associated with the pair of wheels and including a differential lock, the differential lock being selectively movable between a locked position and an unlocked position, wherein the pair of wheels is rotatable together when the differential lock is in the locked position; and
   a differential lock controller configured to facilitate restriction of the wheel speed of at least one of the wheels when the differential lock is in the locked position;
   wherein the differential lock controller is further configured to facilitate selective disablement of the restriction of the wheel speed when the start switch is actuated with the engine operating.

2. The vehicle of claim 1 further comprising handlebars having a left hand grip and a right hand grip, wherein the start switch is located adjacent to the left hand grip.

3. The vehicle of claim 1 further comprising:
   a starter motor associated with the engine;
   a starter solenoid; and
   a relay in electrical communication with the start switch and configured to facilitate selective and alternative electrical communication between the start switch and one of the starter solenoid and the differential lock controller at least partially in response to operation of the engine.

4. The vehicle of claim 3 wherein the relay is operable in one of an energized mode and a de-energized mode at least partially in response to operation of the engine, wherein when the relay is in the de-energized mode, the start switch is in electrical communication with the starter solenoid such that actuation of the start switch facilitates initiation of operation of the engine, and when the relay is in the energized mode, the start switch is in electrical communication with the differential lock controller such that actuation of the start switch facilitates disabling of the restriction of the wheel speed.

5. The vehicle of claim 1 wherein the differential comprises a front differential.

6. The vehicle of claim 1 wherein the start switch comprises a pushbutton.

7. The vehicle of claim 1 further comprising a differential lock switch in communication with the differential lock controller and being configured to facilitate selective movement of the differential lock between the locked position and the unlocked position.

8. The vehicle of claim 1 further comprising a differential lock indicator associated with the differential lock controller and configured to indicate when the differential lock is in the locked position.

9. The vehicle of claim 1 further comprising a transmission and a transmission switch associated with the transmission, wherein the transmission switch is configured to vary operation of the transmission in one of a higher forward driving gear and a lower forward driving gear.

10. The vehicle of claim 1 wherein the start switch comprises a dual-purpose switch that is configured only to selectively initiate operation of the engine and selectively disable the restriction of the wheel speed.

11. The vehicle of claim 1 wherein the differential lock controller is further configured to facilitate disabling of the restriction of the wheel speed once the start switch is actuated for a predetermined amount of time.

12. The vehicle of claim 11 wherein the predetermined amount of time is greater than about 2 seconds.

13. A vehicle comprising:
   a pair of wheels;
   an engine configured to provide motive power to at least one of the pair of wheels;
   a start switch;
   a differential associated with the pair of wheels and including a differential lock, the differential lock being selectively movable between a locked position and an unlocked position, wherein the pair of wheels is rotatable together when the differential lock is in the locked position;
   a controller associated with the engine and configured to control at least one feature of the engine; and
   a relay in electrical communication with each of the start switch and the engine, the relay being operable in one of a first mode and a second mode in response to operation of the engine, wherein when the relay is in the first mode, actuation of the start switch facilitates initiation of operation of the engine, and when the relay is in the second mode, actuation of the start switch facilitates overriding of at least one feature of the controller.

14. The vehicle of claim 13 wherein when the relay is in the second mode, actuation of the start switch overrides a restriction of a wheel speed of the wheels.

15. The vehicle of claim 13 wherein the relay operates in the first mode when the engine is not operating and in the second mode when the engine is operating.

16. A method of controlling a vehicle, the vehicle comprising a pair of wheels and a differential associated with the pair of wheels and including a differential lock, the method comprising:
   initiating operation of an engine of the vehicle in response to actuation of a start switch when the engine is not operating;
   moving the differential lock to a locked position;
   restricting the wheel speed of at least one of the pair of wheels when the differential lock is in the locked position; and
   disabling the restriction of the wheel speed in response to actuation of the start switch during operation of the engine.

17. The method of claim 16 wherein disabling the restriction of the wheel speed further comprises energizing a relay in response to operation of the engine and actuation of the start switch.

18. The method of claim 17 further comprising:
   electrically coupling the start switch with a starter solenoid when the relay is de-energized; and
   electrically coupling the start switch with a differential lock controller when the relay is energized such that the differential lock controller facilitates disabling of the restriction of the wheel speed in response to actuation of the start switch.

19. The method of claim 16 wherein disabling the restriction of the wheel speed occurs once the start switch is actuated during operation of the engine for at least a predetermined period of time.

20. The method of claim 19 wherein the predetermined period of time comprises about 2 seconds.

* * * * *